United States Patent [19]

Furuya et al.

[11] Patent Number: 5,774,562
[45] Date of Patent: Jun. 30, 1998

[54] METHOD AND APPARATUS FOR DEREVERBERATION

[75] Inventors: Kenichi Furuya; Yutaka Kaneda, both of Tokorozawa, Japan

[73] Assignee: Nippon Telegraph and Telephone Corp., Tokyo, Japan

[21] Appl. No.: 822,006

[22] Filed: Mar. 24, 1997

[30] Foreign Application Priority Data

Mar. 25, 1996 [JP] Japan .................................... 8-68550

[51] Int. Cl.$^6$ .............................. H04B 3/20; H04M 1/00; H04M 9/00
[52] U.S. Cl. ........................ 381/66; 381/71.1; 379/406; 379/410
[58] Field of Search ................................ 381/66, 62, 63, 381/94.7, 71.1; 379/406, 410, 388, 390; 84/630

[56] References Cited

U.S. PATENT DOCUMENTS

| | | | |
|---|---|---|---|
| 3,786,188 | 1/1974 | Allen | 381/66 |
| 4,066,842 | 1/1978 | Allen | 381/66 |
| 4,069,395 | 1/1978 | Nash | 381/66 |
| 4,087,633 | 5/1978 | Fitzwilliam | 381/66 |
| 4,131,760 | 12/1978 | Christensen et al. | 381/66 |
| 4,166,924 | 9/1979 | Berkeley et al. | 381/66 |
| 4,420,655 | 12/1983 | Suzuki | 381/66 |
| 4,536,887 | 8/1985 | Kaneda et al. | 381/92 |
| 4,672,674 | 6/1987 | Clough et al. | 381/94.7 |
| 4,683,590 | 7/1987 | Miyoshi et al. | 381/66 |
| 4,956,838 | 9/1990 | Gilloire et al. | 379/388 |
| 5,187,692 | 2/1993 | Haneda et al. | 381/17 |
| 5,208,786 | 5/1993 | Weinstein et al. | 367/124 |
| 5,323,458 | 6/1994 | Park et al. | 379/390 |
| 5,323,459 | 6/1994 | Hirano | 381/66 |
| 5,384,843 | 1/1995 | Masuda et al. | 379/388 |
| 5,396,554 | 3/1995 | Hirano et al. | 379/388 |
| 5,513,265 | 4/1996 | Hirano | 381/66 |
| 5,539,731 | 7/1996 | Haneda et al. | 379/410 |
| 5,559,881 | 9/1996 | Sih | 379/390 |
| 5,563,954 | 10/1996 | Ono et al. | 381/94.7 |
| 5,574,824 | 11/1996 | Slyh et al. | 395/2.35 |
| 5,602,962 | 2/1997 | Kellermann | 381/94.7 |
| 5,604,809 | 2/1997 | Tsubonuma et al. | 381/17 |
| 5,610,991 | 3/1997 | Janse | 381/94.7 |
| 5,664,019 | 9/1997 | Wang et al. | 379/390 |
| 5,706,344 | 1/1998 | Finn | 379/388 |

Primary Examiner—Curtis A. Kuntz
Assistant Examiner—Rexford Barnie
Attorney, Agent, or Firm—Pollock, Vande Sande & Priddy

[57] ABSTRACT

In a method and an apparatus for dereverberation provided speech from speaker is received by a first and second channel microphones which are disposed at different locations, and is input to a first and a second channel reverberant speech input terminal. Input signal in each channel is processed by an inverse filter processor, and a dereverberation evaluation part evaluates dereverberation performance on the basis of an output signal from the inverse filter processor and the input signals of respective channels. Subsequently, filter coefficients in the inverse filter processor are determined and updated in accordance with the evaluation so that a result of evaluation is brought closer to an optimum. By repeating this process, an optimum dereverberation is always enabled in a manner following a variation in an in-room impulse response.

17 Claims, 9 Drawing Sheets

METHOD AND APPARATUS FOR DEREVERBERATION

BACKGROUND OF THE INVENTION

The invention relates to a method and apparatus for dereverberation for use in clearly receiving a speech in a reverberant environment such as a conference room, a hall or the like.

A technique to eliminate reverberations from a reverberant speech is known in the art which comprises generating a reference signal at the location of a speaker, determining a transfer function to a receiving point in advance, calculating an inverse filter of the transfer function, and convoluting the inverse filter with a received signal for purpose of dereverberation. (Refer to Inverse Filtering Of Room Acoustics by M. Miyoshi and Y. Kaneda in IEEE Trans. ASSP, 36(2), pp. 145–152(1988).)

FIG. 1 illustrates the technique employed in a conventional dereverberation apparatus 200 which determines a transfer function to a receiving point in advance, and calculates an inverse filter as shown in the literature cited above. Specifically, the apparatus 200 comprises first and second channel reverberant speech input terminals $2_1$, $2_2$, a dereverberated speech output terminal 3, an inverse filter processing part 4, an inverse filter coefficients calculating part 6 for calculating inverse filter coefficients, first and second channel microphones $7_1$, $7_2$, a transfer function measuring part 21 which determines a transfer function in advance, a reference signal generator 22 which generates a reference signal to be used in the determination of the transfer function, an output terminal 23 from which the reference signal to be used in the determination of the transfer function is to be delivered and a loudspeaker 24. Here, a speaker is shown at 9.

To operate the dereverberation apparatus 200, a reference signal generated by the reference signal generator 22 is passed through the output terminal 23 to be delivered from the loudspeaker 24 which is located at the same location as the speaker 9, at a first step. At a second step, the reference signal on which the reverberation of a room is superimposed is received by the first channel microphone $7_1$ and the second channel microphone $7_2$. At a third step, a transfer function from the location of the speaker 9 to the first channel reverberant speech input terminal $2_1$ and a transfer function from the location of the speaker 9 to the second channel reverberant speech input terminal $2_2$ are calculated by the transfer function measuring part 21 on the basis of the respective received channel signals and the reference signal. At a fourth step, inverse filter coefficients which are effective to cancel out the characteristics of the transfer functions of the respective channels are determined by the inverse filter coefficients calculation part 6, and are used in the inverse filter processing part 4, thus delivering dereverberated speech signal from the output terminal 3.

However, with this technique of the prior art, it is necessary to determine a transfer function from the location of the speaker 9 to a receiving point such as the location of either microphone $7_1$ or $7_2$ in advance. Accordingly, it suffers from the drawback that difficulty is experienced in its application where such a determination of the transfer function in advance cannot be made, where the speaker and/or microphone moves or where the transfer function varies from time to time as a result of movement of a person or articles within a room.

Hong Wang proposes a dereverberation system in which a pair of microphone outputs are passed through respective inverse filters before they are added together. In this system, no use is made of a determination of the transfer function using a reference signal. Instead, transfer functions $C_1$, $C_2$ of two channels from a speaker to a pair of microphone outputs are assumed to provide an evaluation filter having the ratio $C_2/C_1$ as its transfer function. The ratio $C_2/C_1$ is determined such that a difference between an output from the evaluation filter through which the second channel signal is passed and the signal from the first channel becomes equal to 0. Using the ratio $C_2/C_1$ thus determined, coefficients $C_2$, $C_1$ of the two inverse filters are determined based on Pade approximation. (See MULTI-CHANNEL DECONVOLUTION USING PADE APPROXIMATION, IEEE, 1995, pp. 3007–3009.) With this technique, a dereverberated output is not used as evaluation information (since it is not fed back), and accordingly, a dereverberation with high accuracy cannot be expected. A problem also remains that divergence of the ratio occurs if $C_1$ becomes 0 during the calculation of the ratio $C_2/C_1$.

SUMMARY OF THE INVENTION

It is an object of the invention to provide a method and apparatus for dereverberation which overcomes the necessity in the prior art of determining a transfer function from the location of a speaker to a receiving point in advance, and which is applicable to a situation where a determination in advance cannot be made or where the transfer function varies from time to time.

A method of dereverberation according to the invention in which reverberant components are eliminated from a reverberant speech of the speaker which is received by a microphone in a reverberant room comprises the steps of:

(a) providing at least two microphones which are located at different locations to receive reverberant speech from a speaker to provide first and second received signals as inputs;

(b) applying an inverse filter processing to the first and the second received signals to produce a dereverberated signal, the inverse filter processing using inverse filters corresponding to first and second transfer functions from the speaker to respective inputs;

(c) delivering the dereverberated signal as a dereverberated speech signal while determining an evaluation value which corresponds to residual reverberant components on the basis of the first and the second received signals and the dereverberated signal;

(d) determining and updating the inverse filter coefficients which are used in the inverse filter processing so that the evaluation value is brought most close to 0;

(e) and subsequently returning to the step (a) and repeating the steps (a) to (d).

Thus it will be seen that it is the most important feature of the method and the apparatus for dereverberation according to the invention that means is provided which evaluates the performance of dereverberation on the basis of received input signals and a dereverberated output signal and that inverse filter coefficients are calculated in a manner such that a result of evaluation is optimized. It is a distinction of the invention over the prior art that the need to determine the transfer function in advance is eliminated, inasmuch as the dereverberated speech is evaluated and a result of such evaluation is sequentially reflected in subsequent dereverberation operation.

In accordance with the invention, the dereverberation performance evaluation part sequentially performs such evaluation and the inverse filter coefficients calculation part sequentially calculates the inverse filter coefficients on the basis of the result of evaluation even while a processing operation for the dereverberation is being continued. Accordingly, if the transfer function is not known in advance, or if the transfer function varies from time to time, the inverse filter coefficients are sequentially updated to optimize the result of the evaluation, thus assuring a dereverberation.

To reduce the computational complexity, the pair of received channel signals may be divided into a plurality of sub-bands in which decimation is performed before a dereverberation process according to the invention takes place in each sub-band, and the dereverberated sub-band signals are interpolated and synthesized to provide a full band dereverberated signal as an output.

BRIEF DESCRIPTION OF THE DRAWINGS

FIG. 5A is a waveform diagram showing a transfer function of a second inverse filter and its result of estimation used in a simulation;

DETAIL DESCRIPTION OF THE PREFERRED EMBODIMENTS

Figure 1:
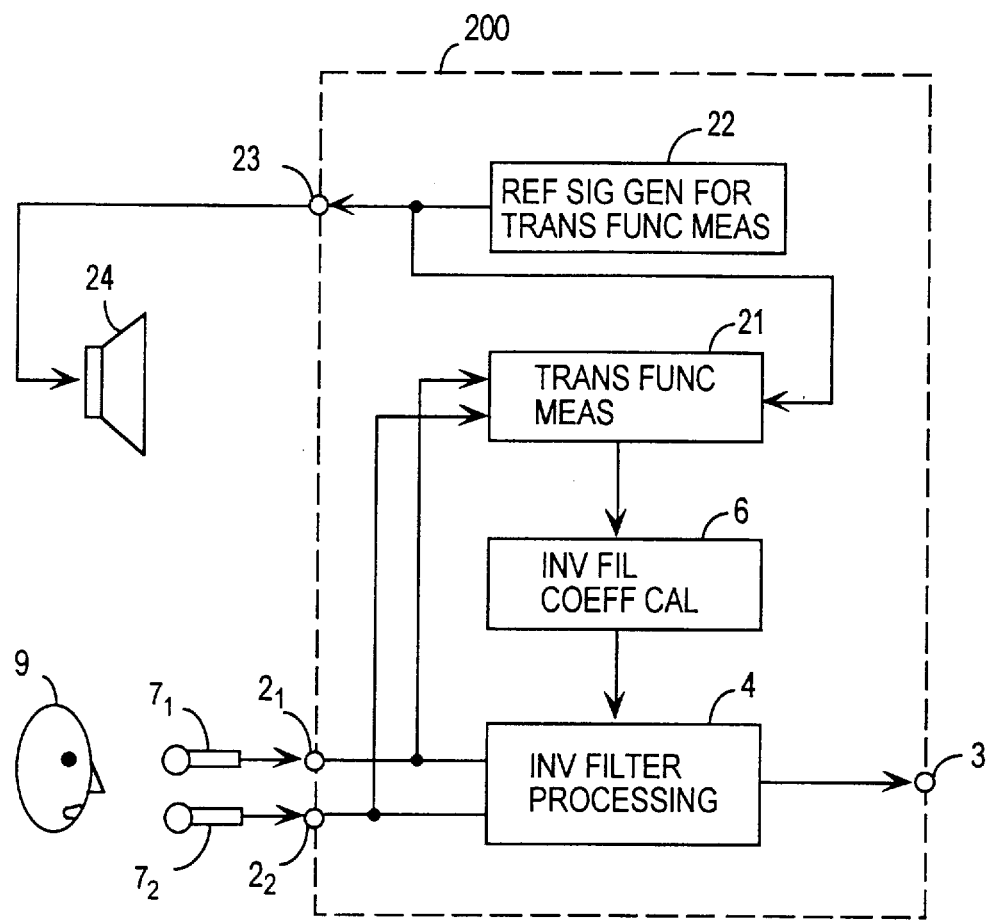
FIG. 1 is a block diagram illustrating dereverberation apparatus of the prior art.
Figure 2:
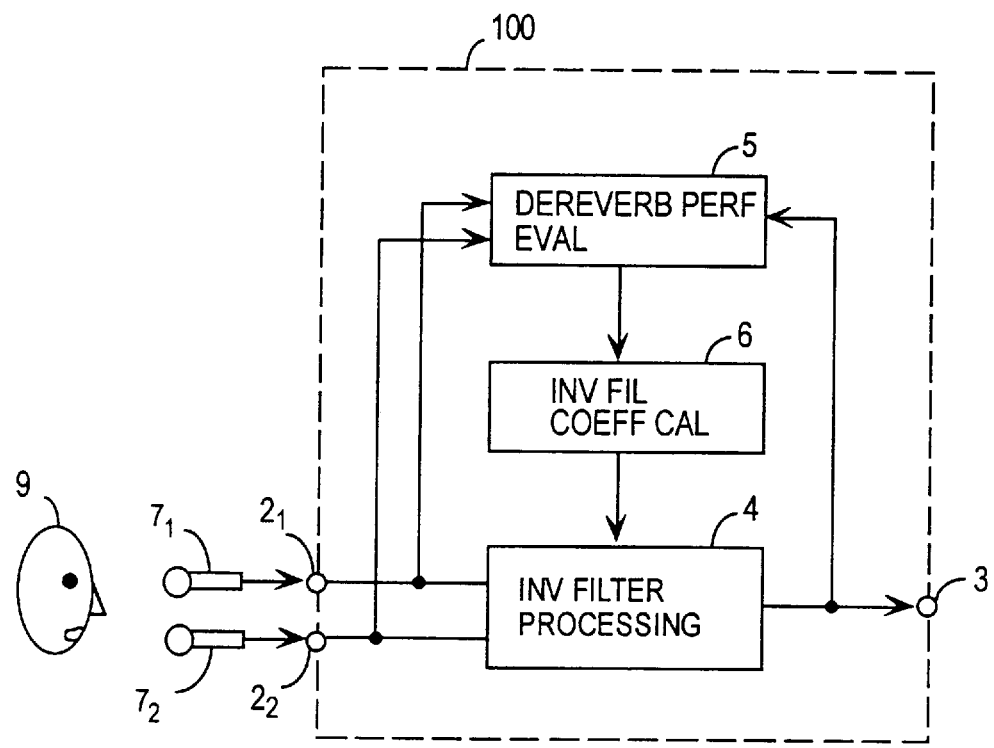
FIG. 2 is a block diagram illustrating the principle of a method and an apparatus for dereverberation according to the invention.

FIG. 2 is a block diagram of a dereverberation apparatus 100 which illustrates the principle of dereverberation according to the invention. Specifically, the apparatus 100 includes a first channel reverberant speech input terminal $2_1$, a second channel reverberant speech input terminal $2_2$, a dereverberated speech output terminal 3, an inverse filter processing part 4, a dereverberation performance evaluation part 5, an inverse filter coefficients calculation part 6, a first channel microphone $7_1$. A second channel microphone $7_2$, and a speaker is indicated at 9.

To operate the dereverberation apparatus 100 according to the invention, speech uttered by the speaker 9 is received by the first and the second channel microphones $7_1$, $7_2$, which are disposed at arbitrary mutually different locations within a room, and fed as first and second channel input signals to the first and second channel reverberant speech input terminals $2_1$, $2_2$, at a first step. At a second step, the input signal of each channel is processed by the inverse filter processing part 4. At a third step, the dereverberation performance evaluation part 5 evaluates a dereverberation performance on the basis of an output signal from the inverse filter processing part 4 and the input signal of each channel. At a fourth step, the inverse filter coefficients calculation part 6 calculates and updates the filter coefficients to be used in the inverse filter processing part 4 on the basis of a result of the evaluation so that the result of the evaluation can be optimized. By repeating the first to the fourth steps, the dereverberation of the signal which is delivered from the terminal 3 takes place.

First Embodiment

Figure 3:
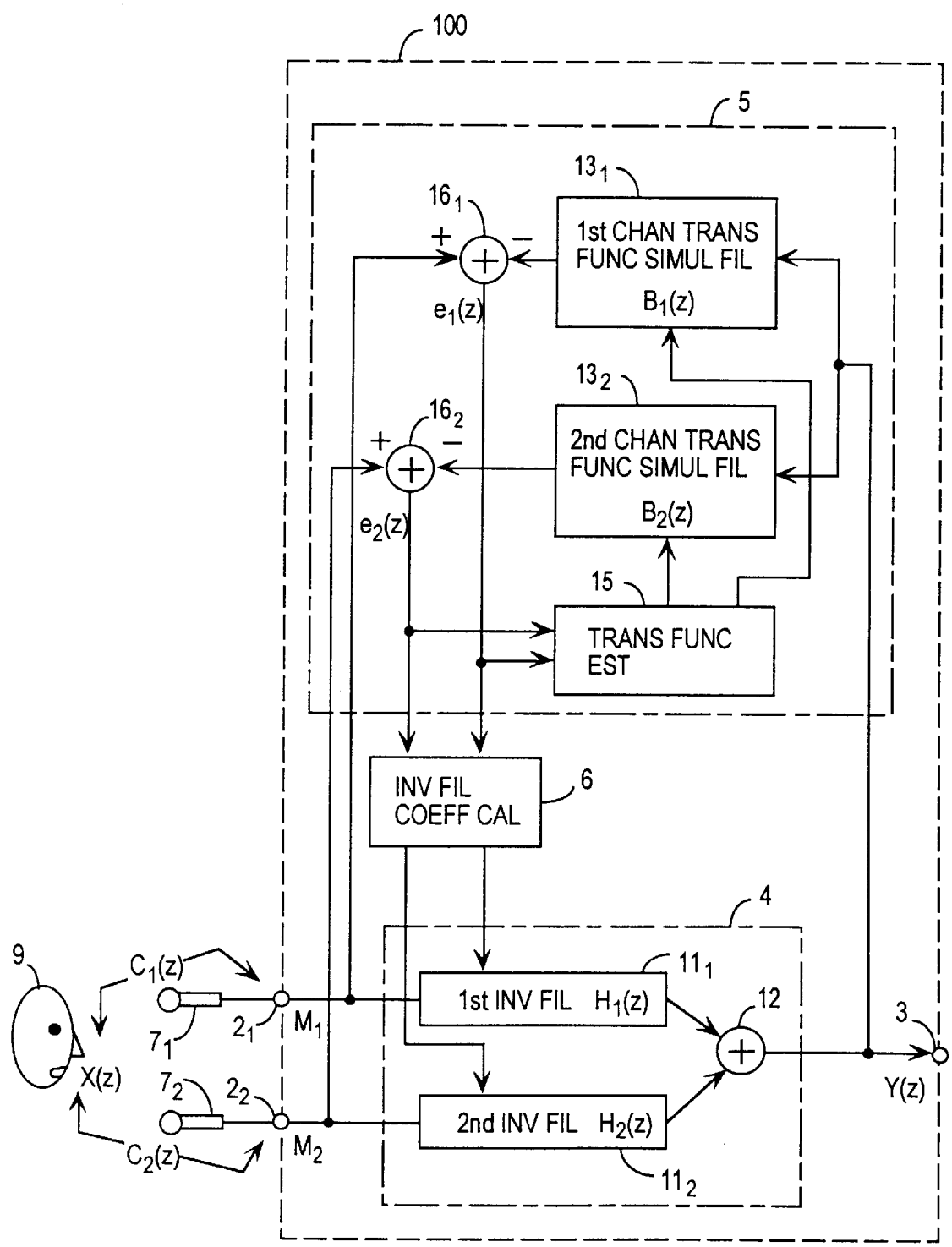
FIG. 3 is a block diagram illustrating a dereverberation apparatus according to a first embodiment of the invention.

FIG. 3 is a block diagram of a first embodiment of dereverberation apparatus which operates on the principle of the invention illustrated in the FIG. 2. Specifically, the apparatus comprises a first inverse filter $11_1$, a second inverse filter $11_2$, an adder 12, a first channel transfer function simulating filter $13_1$, a second channel transfer function simulating filter $13_2$, a transfer function estimation part 15, a first subtractor $16_1$, and a second subtractor $16_2$. The inverse filter processing part 4 shown in FIG. 2 comprises the first inverse filter $11_1$, the second inverse filter $11_2$ and the adder 12 shown in FIG. 3. The dereverberation performance evaluation part 5 shown in FIG. 2 comprises the first channel transfer function simulating filter $13_1$, the second channel transfer function simulating filter $13_2$, the transfer function estimation part 15, the first subtractor $16_1$ and the second subtractor $16_2$ shown in FIG. 3, but operates on the same principle of operation as illustrated in FIG. 2.

The operation will now be described. The input signal from the first channel reverberant speech input terminal $2_1$ is input to the first inverse filter $11_1$ while the input signal from the second channel reverberant speech input terminal $2_2$ is input to the second inverse filter $11_2$. Output signals from the respective inverse filters $11_1$, $11_2$ are added together in the adder 12 to be delivered as dereverberated speech from the dereverberated speech output terminal 3. An output signal from the adder 12 is input to both the first and the second channel transfer function simulating filters $13_1$, $13_2$. The first subtractor $16_1$ produces a difference $e_1(z)$ between the output signal from the first channel transfer function simulating filter $13_1$ and the input signal from the first channel reverberant speech input terminal $2_1$. The second subtractor $16_2$ produces a difference $e_2(z)$ between the output signal from the second channel transfer function simulating filter $13_2$ and the input signal from the second channel reverberant speech input terminal $2_2$. The inverse filter coefficients calculation part 6 operates to calculate coefficients of the first and the second inverse filters $11_1$,$11_2$ so that error signals $e_1(z)$, $e_2(z)$ which are difference outputs from the subtractors 161, 162 become equal to 0. In addition, the transfer function estimation part 15 operates to calculate the filter coefficients of the first and the second channel transfer function simulating filters $13_1$, $13_2$ so that error signals $e_1(z)$, $e_2(z)$ which are output from the subtractors $16_1$, $16_2$ become equal to 0, thus achieving the dereverberation.

It is to be noted that the error signals $e_1(z)$, $e_2(z)$ which are output from the respective subtractors $16_1$, $16_2$ represent evaluation values for the dereverberation performance, and it can be shown that when such error signals become equal to 0, the dereverberation is completely achieved, as will be discussed below. Generally, transfer function of a filter is defined by its filter coefficients. Accordingly, a transfer function is equivalent to filter coefficients, and therefore in the description to follow, a denotation such as H(z), C(z) which represents a transfer function of a filter is also used as a denotation representing filter coefficients.

As indicated in FIG. 3, a Z-transform of a speech signal is represented by X(z), a transfer function from the speaker 9 to the first channel reverberant speech input terminal $2_1$ by $C_1(z)$, a transfer function from the speaker 9 to the second channel reverberant speech input terminal $2_2$ by $C_2(z)$, an input signal to the first channel reverberant speech input terminal $2_1$ by $M_1(z)$, an input signal to the second channel reverberant speech input terminal $2_2$ by $M_2(z)$, transfer functions of the first and the second inverse filters $11_1$, $11_2$ by $H_1(z)$, $H_2(z)$, respectively, transfer functions of the first and second channel transfer function simulating filters $13_1$, $13_2$, by $B_1(z)$, $B_2(z)$, respectively, a dereverberated speech signal by Y(z), an output error signal from the first subtractor $16_1$, by $e_1(z)$, and an output error signal from the second subtractor $16_2$ by $e_2(z)$.

In the following, it will be shown that when the transfer functions $H_1(z)$, $H_2(z)$, $B_1(z)$, $B_2(z)$ are chosen so that the error signals $e_1(z)$, $e_2(z)$ are equal to 0, it holds that $B_1(z) = \alpha C_1(z)$, and $B_2(z) = \alpha C_2(z)$ (where $\alpha$ represents an arbitrary constant), that $H_1(z)$, $H_2(z)$ are inverse filters of $C_1(z)$, $C_2(z)$, respectively, and that $Y(z) = (1/\alpha)X(z)$, or stated differently, that the speech signal can be recovered except for a constant multiple.

Referring to FIG. 3, when $e_1(z)$, $e_2(z)$ are equal to 0, $$\begin{aligned} e_1(z) &= M_1(z) - B_1(z)Y(z) \\ &= [C_1(z) - B_1(z)\{H_1 C_1(z) + H_2(z) C_2(z)\}]X(z) \\ &= 0 \\ e_2(z) &= M_2(z) - B_2(z)Y(z) \\ &= [C_2(z) - B_2(z)\{H_1(z) C_1(z) + H_2(z) C_2(z)\}]X(z) \\ &= 0 \end{aligned} \quad (1)$$

When the equation (1) applies for any arbitrary speech signal X(z), it must be such that $$C_1(z) = B_1(z)\{H_1(z)C_1(z) + H_2(z) C_2(z)\}$$
$$C_2(z) = B_2(z)\{H_1(z)C_1(z) + H_2(z) C_2(z)\} \quad (2)$$

Assuming that $C_1(z)$, $C_2(z)$ have a finite length and do not have common zeros, it follows from the equation (2) that $$C_1(z)B_2(z) = C_2(z)B_1(z)$$

Since $B_1(z)$ simulates $C_1(z)$ and $B_2(z)$ simulates $C_2(z)$, we can rewrite this as $B_1(z) = \alpha C_1(z)$. Then it will be seen that $$B_2(z) = \alpha C_2(z) \quad (3)$$

where $\alpha$ represents an arbitrary constant. The substitution of the equation (3) into the equation (2) yields $$C_1(z) = \alpha C_1(z)\{H_1(z)C_1(z) + H_2(z)C_2(z)\}$$
$$C_2(z) = \alpha C_2(z)\{H_1(z)C_1(z) + H_2(z)C_2(z)\} \quad (4)$$

Dividing both sides by $\alpha C_1(z)$, $\alpha C_2(z)$, we have $$1/\alpha = H_1(z)C_1(z) + H_2(z)C_2(z) \quad (5)$$

The signal Y(z) which is delivered through the inverse filter processing part 4 shown in FIG. 3 can be expressed as follows:

$$Y(z) = \{H_1(z)C_1(z) + H_2(z)C_2(z)\}X(z) \quad (6)$$

Accordingly, $$Y(z) = (1/\alpha)X(z) \quad (7)$$

This means that Y(z) is equal to the speech signal X(z) except for a constant multiple.

It will be seen from the foregoing that the dereverberation can take place successfully when the inverse filter coefficients calculation part 6 determine the filter coefficients to be used in the first and the second inverse filters $11_1$, $11_2$ and when the transfer function estimation part 15 determines filter coefficients to be used in the first and the second channel transfer function simulating filters $13_1$, $13_2$ so that the output error signals $e_1(z)$, $e_2(z)$ from the subtractors $16_1$, $16_2$ become equal to 0.

Methods to calculate the filter coefficients will now be described. A first method is one in which filter coefficients are determined so that the powers of error signals $e_1(z)$, $e_2(z)$ are minimized by using an adaptive algorithm such as NLMS (Normalized Least Mean Square) or projection technique, for example, in the inverse filter coefficients calculation part 6 and the transfer function estimation part 15.

However, in the first method of calculation, filter transfer functions to be determined, $H_1(z)$, $H_2(z)$ and $B_1(z)$, $B_2(z)$, are coupled seriatim, and accordingly, there is a likelihood that the error signals $e_1(z)$, $e_2(z)$ do not form a simple quadratic curved error surface, and the filter coefficients may converge to a locally optimized solution. To accommodate for this, in a second method of calculation, a further evaluation value is used together with the error signals $e_1(z)$, $e_2(z)$ to average the curved error surface, thus preventing a locally optimized solution from occurring. A specific embodiment will be described below.

Second Embodiment

Figure 4:
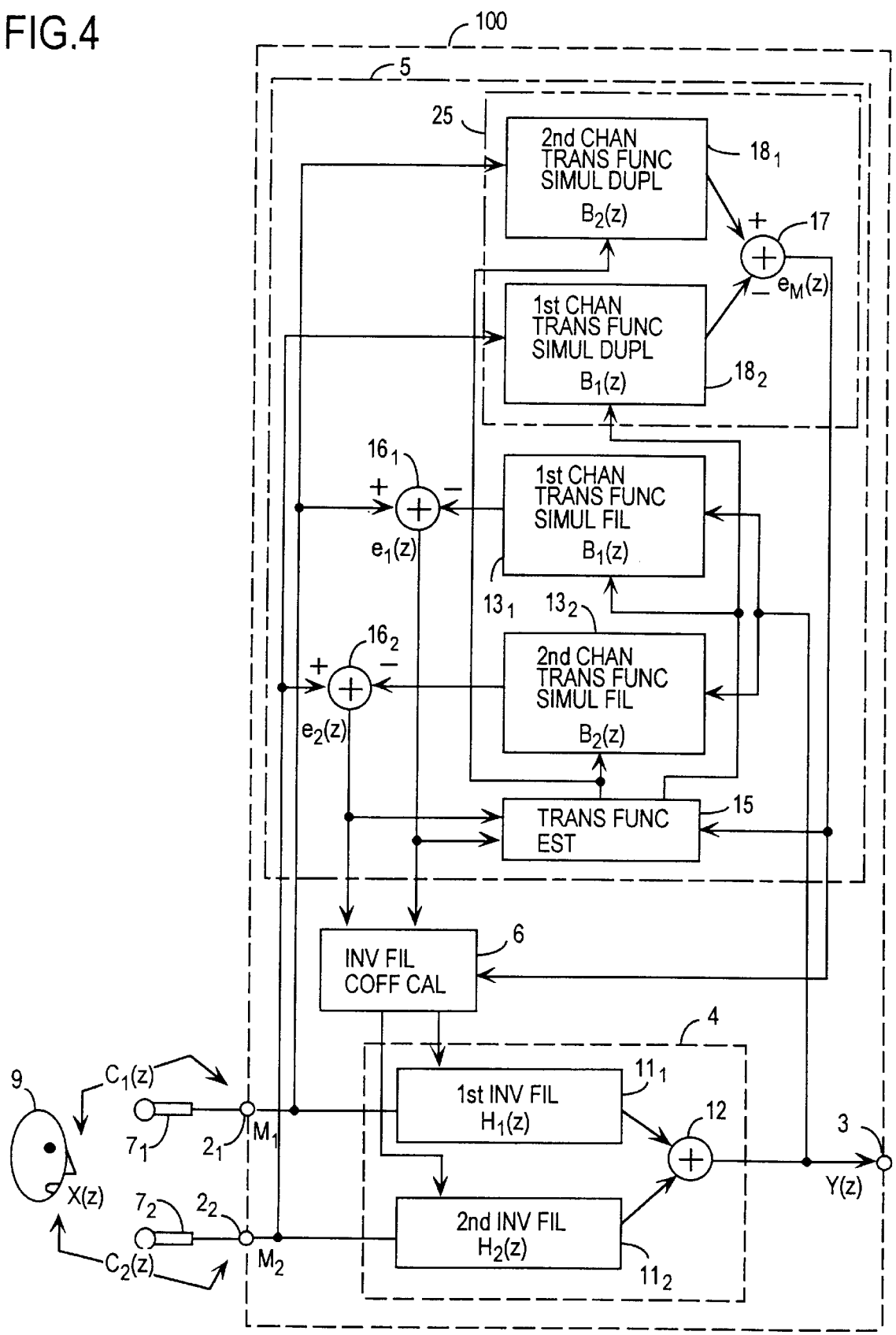
FIG. 4 is a block diagram of a dereverberation apparatus according to a second embodiment of the invention.

FIG. 4 is a block diagram of a dereverberation apparatus according to a second embodiment of the invention. Specifically, the apparatus of the second embodiment comprises the same arrangement as shown in FIG. 3, but in which a filter coefficients restraint part 25 comprising a second channel transfer function simulating duplicate filter $18_1$1, a first channel transfer function simulating duplicate filter $18_2$ and an error detecting part 17 is added as a component of the dereverberation performance evaluation part 5 shown in the first embodiment of the FIG. 3.

The operation of this apparatus will now be described. The second channel transfer function simulating duplicate filter $18_1$, has filter coefficients which are duplicates of the filter coefficients $B_2(z)$ of the second channel transfer function simulating filter $13_2$. Similarly, the first channel transfer function simulating duplicate filter $18_2$ has filter coefficients which are duplicates of the filter coefficients $B_1(z)$ of the first channel transfer function simulating filter $13_1$. The input signal $M_1(z)$ from the first channel reverberant speech input terminal $2_1$ is input to the second channel transfer function simulating duplicate filter $18_1$ while the input signal $M_2(z)$ from the second channel reverberant speech input terminal $2_2$ is input to the first channel transfer function simulating duplicate filter $18_2$. The error detecting part 17 detects a difference between an output signal from the second channel transfer function simulating duplicate filter $18_1$ and an output signal from the first channel transfer function simulating duplicate filter $18_2$ thus providing an error signal $e_m(z)$ which is applied to the inverse filter coefficients calculation part 6 and the transfer function estimation part 15.

It is to be understood that Z-transform of filter coefficients of the second channel transfer function simulating duplicate filter $18_1$ is represented by $B_2(z)$, Z-transform of filter coefficients of the first channel transfer function simulating duplicate filter $18_2$ is represented by $B_1(z)$, and the output error signal from the error detecting part 17 is represented by em(z), as entered in several portions of FIG. 4. Since an input signal to the first channel dereverberant speech input terminal $2_1$ and an input signal to the second channel dereverberant speech input terminal $2_2$ are given by $M_1(z) = C_1(z)X(z)$ and $M_2(z)=C_2(z)X(z)$, the error signal $e_m(z)$ is expressed as follows:

$$em(z)=M_1(z)B_2(z)-M_2(z)B_1(z)=\{C_1(z)B_2(z)-C_2(z)B_1(z)\}X(x) \quad (8)$$

As discussed previously in connection with the first embodiment shown in FIG. 3, the filter coefficients $B_1(z)$ and $B_2(z)$ simulate the transfer functions $C_1(z)$ and $C_2(z)$ from the speaker 9 to the input terminals $2_1$ and $2_2$, respectively, and accordingly, a series connection of transfer functions $C_1(z)$ and $B_2(z)$ and a series connection of the transfer functions $C_2(z)$ and $B_1$, which form paths from the speaker 9 to the error detecting part 17 as shown in FIG. 4, should ideally be equivalent to each other. Conversely, to make the error signal $e_m(z)$ as defined by the equation (8) to be equal to 0, it is necessary that $B_1(z)=\alpha C_1(z)$, and $B_2(z)=\alpha C_2(z)$, which is the same requirement as given by the equation (3). This means that if $B_1(z)$ and $B_2(z)$ simulate $C_1(z)$ and $C_2(z)$, respectively, with good accuracy, an output signal from the second channel transfer function simulating duplicate filter $18_1$ will be $M_1(z)C_2(z)=X(z)C_1(z)C_2(z)$ while an output signal from the first channel transfer function simulating duplicate filter $18_2$ will be $M_2(z)C_1(z)=X(z)C_2(z)C_1(z)$, whereby the output error signal $e_m(z)$ from the error detecting part 17 will be equal to 0. Hence, by updating the filter coefficients $H_1(z)$ $H_2(z)$, $B_1(z)$ $B_2(z)$ so that $e_m(z)$ becomes equal to 0 at the same time as $e_1(z)$, $e_2(z)$ become equal to 0, the curved error surface resulting from $e_m(z)$ and the curved error surface resulting from $e_1(z)$, $e_2(z)$ are averaged, whereby a convergence into a locally optimized solution hardly ever occurs. At this end, the filter coefficients of the first and second inverse filters $11_1$, $11_2$ and the first second channel transfer function simulating filters $13_1$, $13_2$ are determined by the inverse filter coefficients calculation part 6 and the transfer function estimation part 15 so that the output error signal $e_m(z)$ from the error detecting part 17 is made equal to 0 in addition to the output error signal $e_1(z)$ from the first subtractor $16_1$ and the output error signal $e_2(z)$ from the second subtractor $16_2$.

To illustrate this, an example of using the projection algorithm in the inverse filter coefficients calculation part 6 and the transfer function estimation part 15 to determine the filter coefficients so that $e_1(z)$, $e_2(z)$, $e_m(z)$ are all equal to 0 will be described.

Representing respective filter coefficient vectors at k-th time corresponding to the inverse Z-transforms of $H_1(z)$, $H_2(z)$, $B_1(z)$, $B_2(z)$ by $h_1(k)$, $h_2(k)$, $b_1(k)$, $b_2(k)$, time signals corresponding to the inverse Z-transforms of $M_1(z)$, $M_2(z)$ by $m_1(k)$, $m_2(k)$, and time signals corresponding to the inverse Z-transforms of $e_1(z)$, $e_2(z)$, $e_m(z)$ by $E_1(k)$, $E_2(k)$, $E_3(k)$, filter coefficient vectors of the first and second inverse filters $11_1$, $11_2$ and the first and second channel transfer function simulating filters $13_1$, $13_2$ are determined from iterative equations (9) and (10) given below:

$$\begin{bmatrix} h_1(k+1) \\ h_2(k+1) \end{bmatrix} = \begin{bmatrix} h_1(k) \\ h_2(k) \end{bmatrix} + \mu M_1(k)\beta_1(k)E(k) \quad (9)$$

$$\begin{bmatrix} b_1(k+1) \\ b_2(k+1) \end{bmatrix} = \begin{bmatrix} b_1(k) \\ b_2(k) \end{bmatrix} + \mu M_2(k)\beta_2(k)E(k) + \lambda M_3(k)\beta_3(k)F(k) \quad (10)$$

where $$E(k) = \begin{bmatrix} E_1(k), (1-\mu)E_1(k-1), \ldots, (1-\mu)^{p-1}E_1(k-p+1) \\ E_2(k), (1-\mu)E_2(k-1), \ldots, (1-\mu)^{p-1}E_2(k-p+1) \end{bmatrix}^T$$

$$F(k) = \begin{bmatrix} E_3(k), (1-\mu)E_3(k-1), \ldots, (1-\mu)^{p-1}E_3(k-p+1) \\ E_3(k), (1-\mu)E_3(k-1), \ldots, (1-\mu)^{p-1}E_3(k-p+1) \end{bmatrix}^T$$

$$\beta_1(k) = [M_1(k)^T M_1(k) + \delta I]^{-1}$$

$$\beta_2(k) = [M_2(k)^T M_2(k) + \delta I]^{-1}$$

$$\beta_3(k) = [M_3(k)^T M_3(k) + \delta I]^{-1}$$

$$M_1(k) = [m'(k), m'(k-1), \ldots, m'(k-p+1)]^T$$

$$m'(k) = [m'_1(k), m'_1(k-1), \ldots, m'_1(k-L_1+1),$$
$$m'_2(k), m'_2(k-1), \ldots, m'_2(k-L_2+1)]^T$$

$$m'_1(k) = m_1(k)*b_1(k)$$

$$m'_2(k) = m_2(k)*b_2(k)$$

$$M_2(k) = [y(k), y(k-1), \ldots, y(k-p+1)]^T$$

$$y(k) = [y(k), y(k-1), \ldots, y(k-L_3+1),$$
$$y(k), y(k-1), \ldots, y(k-L_4+1)]^T$$

$$M_3(k) = [m(k), m(k-1), \ldots, m(k-p+1)]^T$$

$$m(k) = [m_2(k), m_2(k-1), \ldots, m_2(k-L_3+1),$$
$$-m_1(k), -m_1(k-1), \ldots, -m_1(k-L_4+1)]^T$$

It is to be noted that * represents a convolution of the respective filter coefficient vector at k-th time point, p an order of projection, $L_1$, $L_2$, $L_3$, $L_4$ lengths of respective filter coefficient vectors, $\delta$ a constant which is effective to allow stable calculation of the inverse filters, $\mu$ and $\lambda$ step gains, and I a unit matrix. To determine an arbitrary constant $\alpha$, the calculation is made by fixing on a single point on an arbitrary coefficient vector of $b_1(k)$, $h_2(k)$. The use of the equations (9) and (10) enables filter coefficient vectors for the first and second inverse filters $11_1$, $11_2$ and the first and second channel transfer function simulating filters $13_1$, $13_2$ to be determined adaptively so that the respective outputs from the first subtractor $16_1$, the second subtractor $16_2$ and the error detecting part 17 can be made equal to 0.

When calculating filter coefficients in the inverse filter coefficients calculation part 6 and the transfer function estimation part 15 in the embodiment shown in FIG. 3, an adaptive algorithm such as NLMS or the projection technique may also be employed to allow an adaptive calculation so that the outputs from the first subtractor $16_1$ and the second subtractor $16_2$ can be made equal to 0.

Figure 5A:
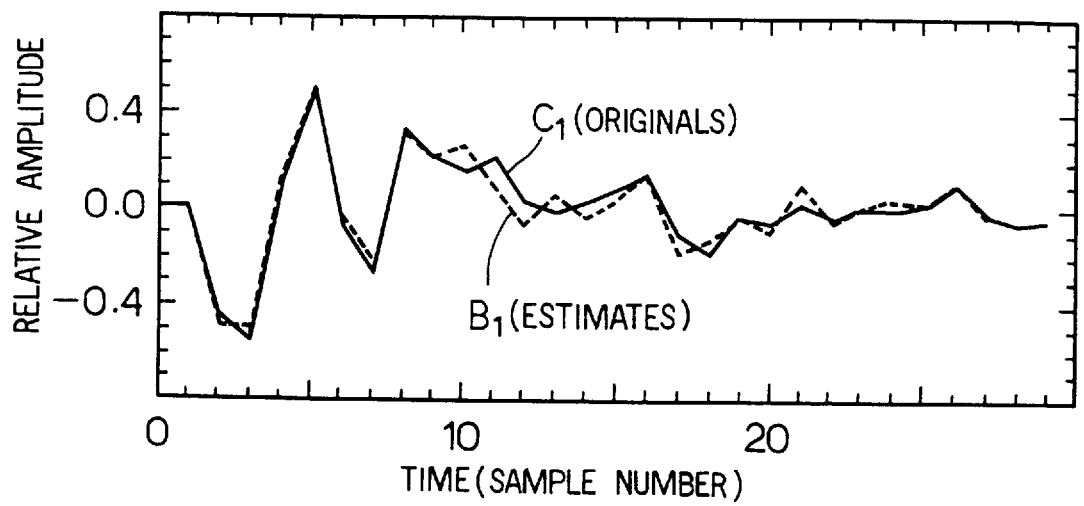
FIG. 5A is a waveform diagram showing a transfer function of a first inverse filter and its result of estimation used in a simulation.
Figure 5B:
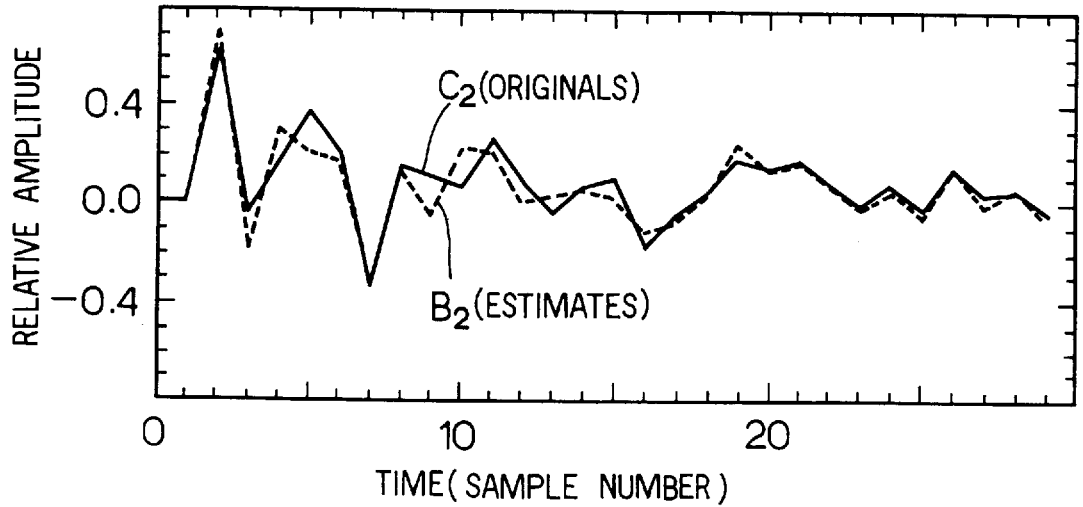
Figure 6A:
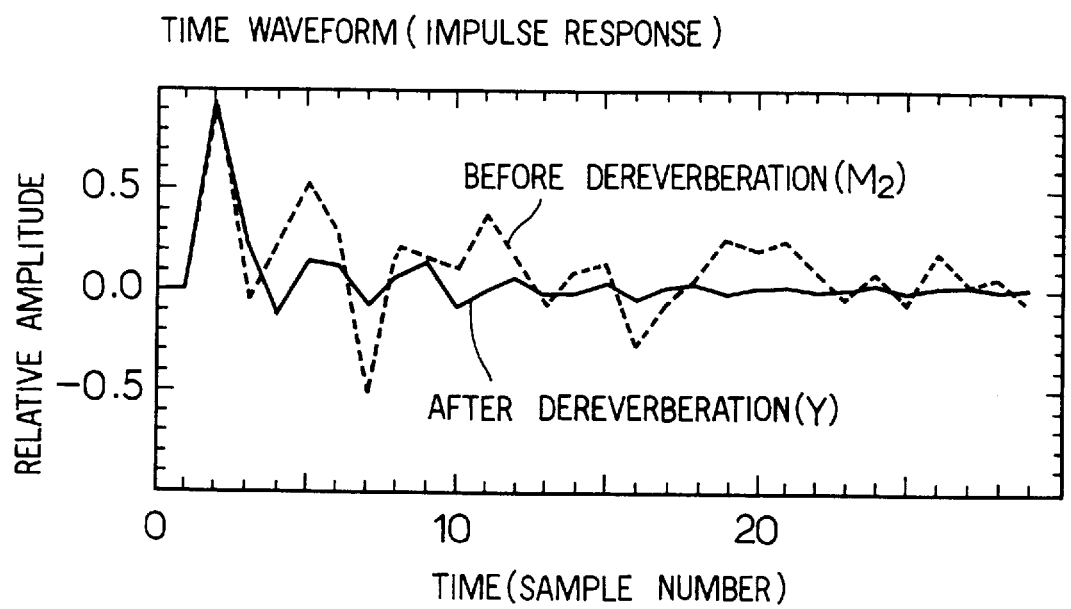
FIG. 6A illustrates an impulse response as a result of the dereverberation processing using the dereverberation apparatus of the invention.
Figure 6B:
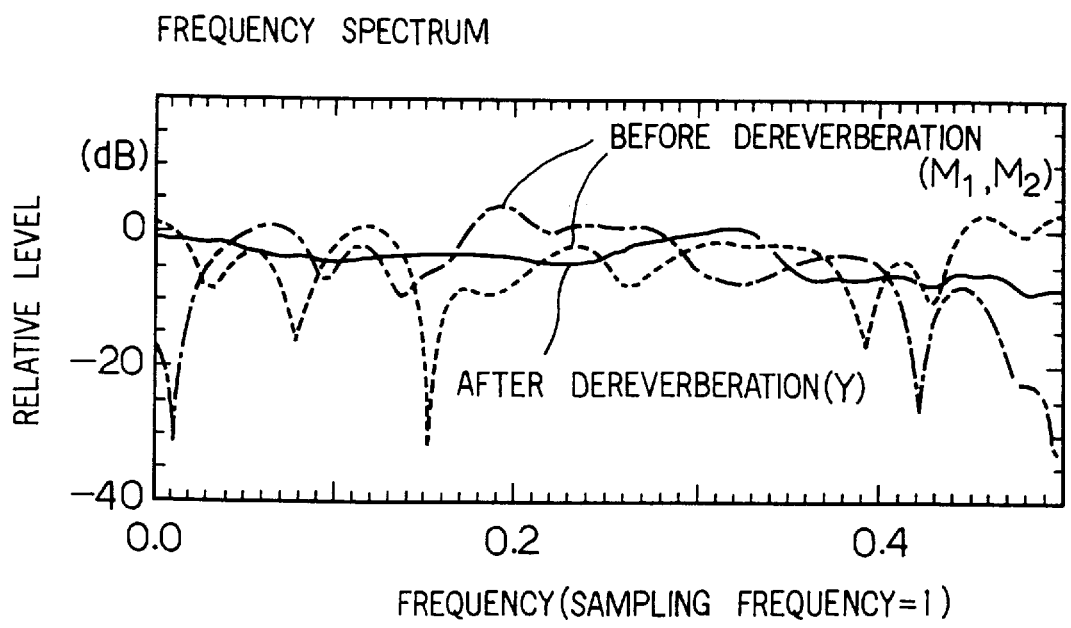
FIG. 6B illustrates a frequency characteristic of the impulse response shown in FIG. 6A.

To confirm the operation of the dereverberation apparatus according to the second embodiment of the invention shown in FIG. 4, a dereverberation simulation test has been conducted using 30 tap transfer functions $C_1$, $C_2$ shown in FIGS. 5A and 5B, as an example of impulse response. A white noise signal has been used as a sound source signal serving as the speaker 9. The first inverse filter $11_1$ has a filter coefficient $H_1$ and the second inverse filter $11_2$ has a filter coefficient $H_2$, each having a tap length of 29. The first channel transfer function simulating filter $13_1$ has a filter coefficient $B_1$ and the second channel transfer function simulating filter $13_2$ has a filter coefficient $B_2$, each having a tap length of 30. Original transfer functions $C_1$, $C_2$ (shown in solid line) and estimated transfer functions $B_1$, $B_2$ (shown in broken lines) are shown as waveforms plotted against time in FIGS. 5A and 5B. It will be seen from FIGS. 5A and 5B that a good estimation is achieved at the waveform level inclusive of the phase. The waveform of the dereverberated output signal Y(z) is shown in solid line in FIGS. 6A and 6B when an impulse is generated as a sound source serving as the speaker 9, while the waveforms of the two input signals $M_1$, $M_2(z)$ before the dereverberation are shown in broken lines and single dot phantom lines. It will be seen from FIG. 6A, which covers the time domain, that a reverberant component which lasts after the impulse sound is diminished by the dereverberation apparatus of the invention. It will also be noted from FIG. 6B, which covers the frequency domain, that the frequency spectrum is flattened as an effect of suppressing the reverberation according to the method of the invention.

Third Embodiment

Figure 7:
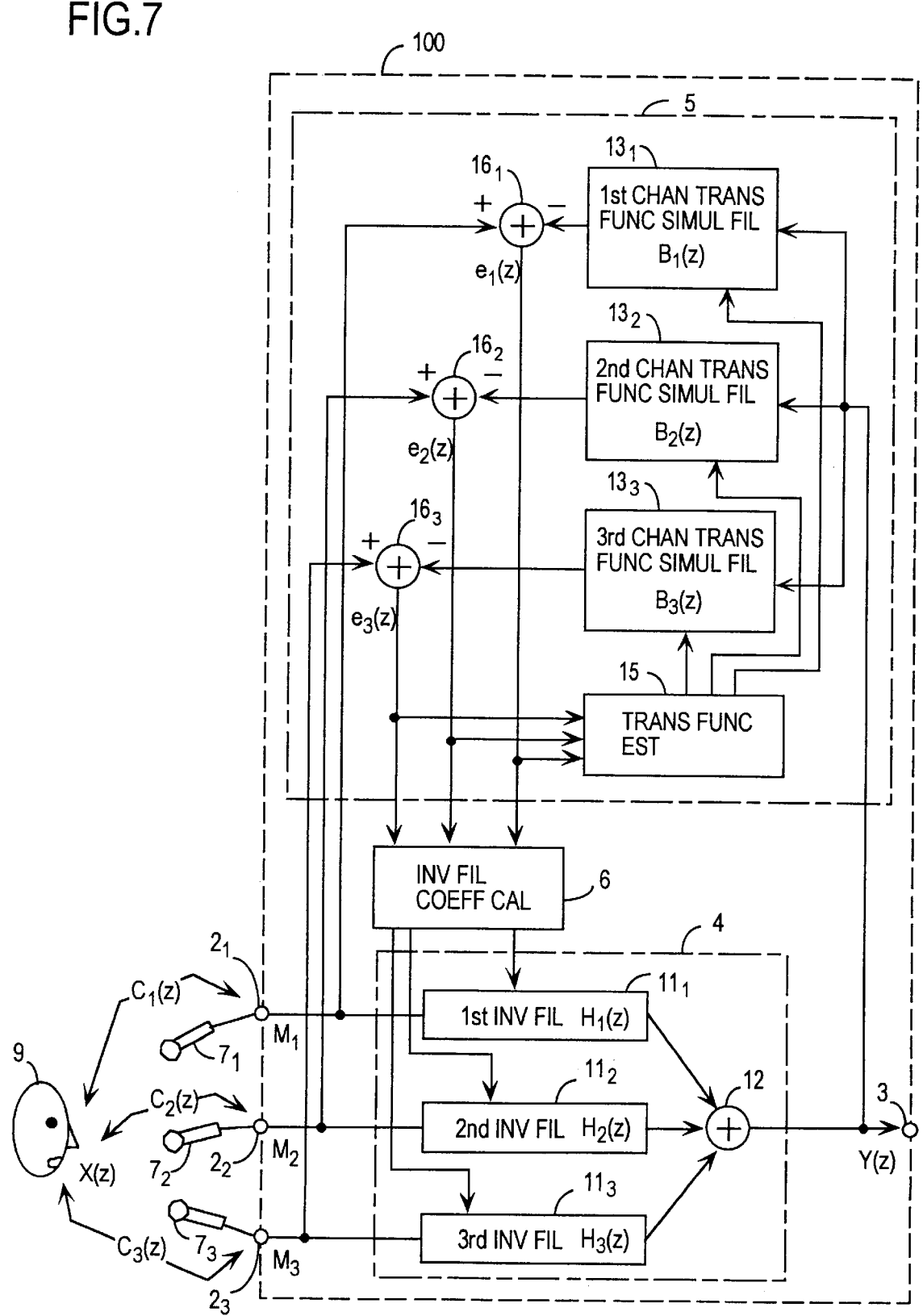
FIG. 7 is a block diagram of a dereverberation apparatus according to a third embodiment of the invention.

In the embodiments described above, two microphones are disposed at different locations, and an estimation of coefficients of inverse filters corresponding to the transfer functions of two channels on the basis of speech signals of the two channels from the same speaker (sound source) in a manner such that the reverberant components contained in these signals cancel each other has been described. However, the principle of the invention is not limited to its use to two channels, but is equally applicable to three or more channels. FIG. 7 shows a system arrangement when the arrangement of the first embodiment as shown in FIG. 3 is applied to three channels, and corresponding parts to those shown in FIG. 3 are designated by like reference numerals as used before.

Signals from first, second and third microphones $7_1$, $7_2$, $7_3$, which are disposed at three different locations, are fed through input terminals $2_1$, $2_2$, $2_3$, respectively, to be applied to first, second and third inverse filters $11_1$, $11_2$, $11_3$, respectively, and also applied to first, second and third subtractors $16_1$, $16_2$, $16_3$, respectively. Outputs from the three inverse filters $11_1$, $11_2$, $11_3$ are added together at an adder 12, and the sum is delivered to an output terminal 3 as a dereverberated signal, and is also fed to first, second and third channel transfer function simulating filters $13_3$, $13_2$, $13_3$ in common. Outputs from these transfer function simulating filters $13_1$, $13_2$, $13_3$ are fed to the first, second and third subtractors $16_1$, $16_2$, $16_3$, respectively, to be subtracted from the input signals which are supplied from input terminals $2_1$, $2_2$, $2_3$, respectively. Results of subtraction are delivered as error signals $e_1(z)$, $e_2(z)$, $e_3(z)$.

Error signals $e_1(z)$, $e_2(z)$, $e_3(z)$ from the subtractors $16_1$, $16_2$, $16_3$ are fed to an inverse filter coeffients calculation part 6, and are also fed to a transfer function estimation part 15. In a manner similar to that described above in connection with the first embodiment shown in FIG. 3, the inverse filter coefficients calculation part 6 and the transfer function estimation part 15 determine the inverse filter coefficients $H_1(z)$, $H_2(z)$, $H_3(z)$ and $B_1(z)$, $B_2(z)$, $B_3(z)$, respectively, by an adaptive algorithm, for example, so that the error signals $e_1(z)$, $e_2(z)$, $e_3(z)$ may become equal to 0, and set thus determined filter coefficients to the first, second and third inverse filters $11_1$, $11_2$, $11_3$ and the first, second and third channel transfer function simulating filters $13_1$, $13_2$, $13_3$, respectively.

Fourth Embodiment

Assuming a reverberation time in a room of 200 msec, when an impulse response is sampled at 12 KHz, the order of the impulse response which represents the reverberation characteristic will be approximately 2400 orders. It is then necessary to set the order of the inverse filters $11_1$, $11_2$ and the transfer function simulating filters $13_1$, $13_2$ in the first and second embodiments (shown in FIGS. 2 and 3) or the order of the transfer function simulating filters $18_1$, $18_2$ in the embodiment shown in FIG. 4 as high as 2400 in a manner corresponding to the room impulse response which exhibits such a high order, requiring a tremendous amount of calculations in order to determine their filter coefficients by using an adaptive algorithm such as a projection algorithm, for example. It is well known in the art that the amount of calculation which is required to execute such an adaptive algorithm can be reduced by dividing an input speech to each channel into sub-bands, in each of which decimation is carried out to reduce the order of the transfer function per sub-band before a desired processing operation, which is a dereverberation in the presented instance, is carried out in each sub-band. Subsequently to dereverberation processing, samples are interpolated in the respective sub-bands and all the dereverberated sub-band signals are synthesized into a whole band signal.

Figure 8:
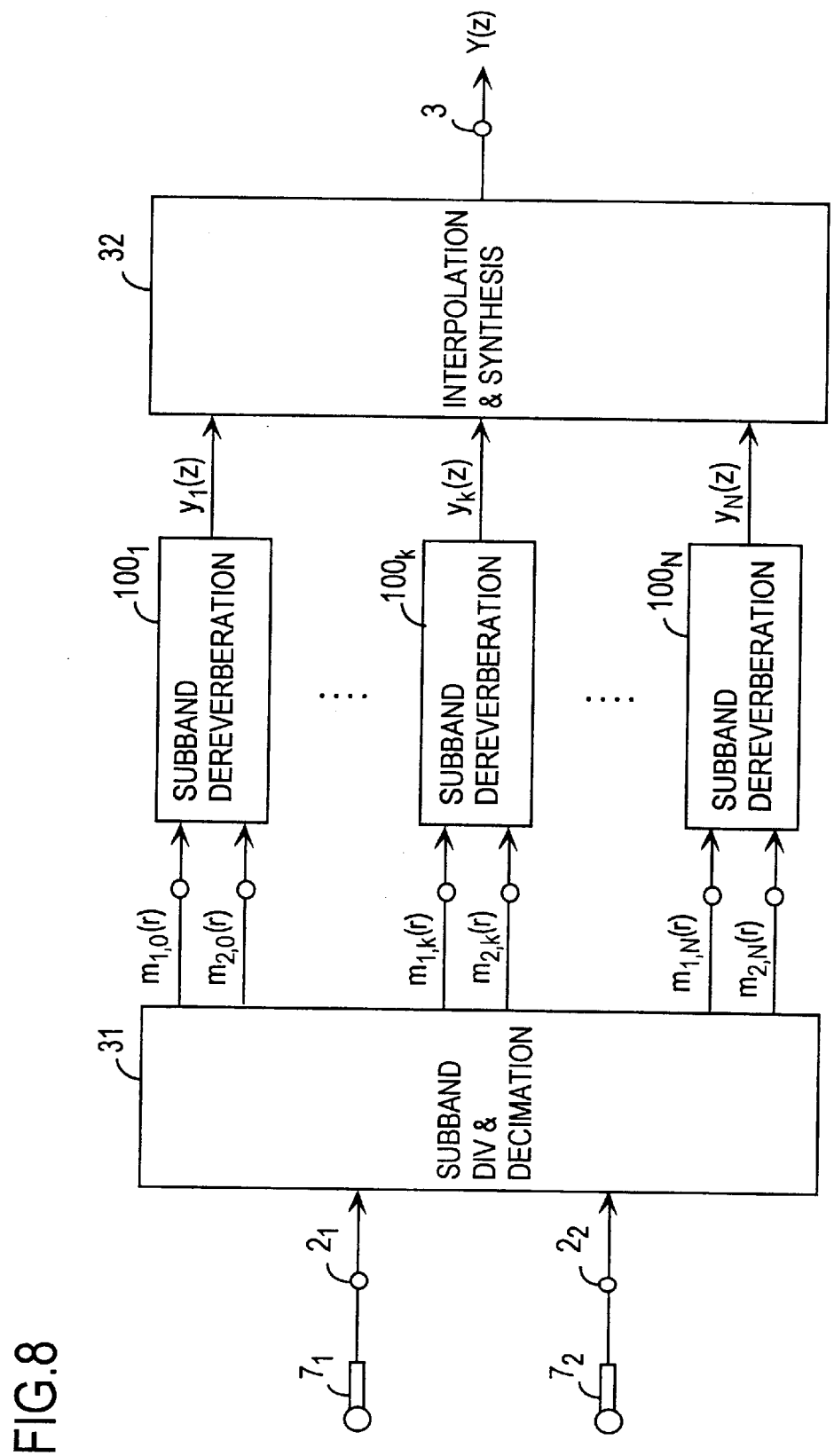
FIG. 8 is a block diagram of a dereverberation apparatus according to a fourth embodiment of the invention.

An embodiment which utilize the division into sub-bands will be described with reference to FIG. 8. As shown, in this embodiment, a set of signals $M_1(z)$, $M_2(z)$ received by microphones $7_1$, $7_2$ are applied to a sub-band division/decimation part 31 in which the set of signals $M_1(z)$, $M_2(z)$ is divided into N sub-bands (N is an integer equal to or greater than 2), and samples in the set of sub-band signals are decimated at a predetermined decimation rate R to provide a set of sub-band signals $m_{1k}(z)$, $m_{2k}(z)$ (k=1, . . . ,N).

These sets of sub-band signals are applied respectively to a corresponding one of sub-band dereverberation parts $100_1$, . . . , $100_N$. Each of the sub-band dereverberation parts $100_1$, . . . , $100_N$ may be constructed in a manner similar to that shown in any one of FIGS. 2, 3 and 4, for example, but the order of each-filter used is reduced in a manner corresponding to the decimation rate R. Dereverberated signals $y_1$, . . . , $y_N(z)$ from the dereverberation parts $100_1$, . . . , $100_n$ are fed to an interpolation/synthesis part 32 where a number of decimated samples in the respective sub-bands are interpolated and synthesized into a whole sub-band signal, which is delivered as a whole band signal Y(z) to a terminal 3.

Figure 9:
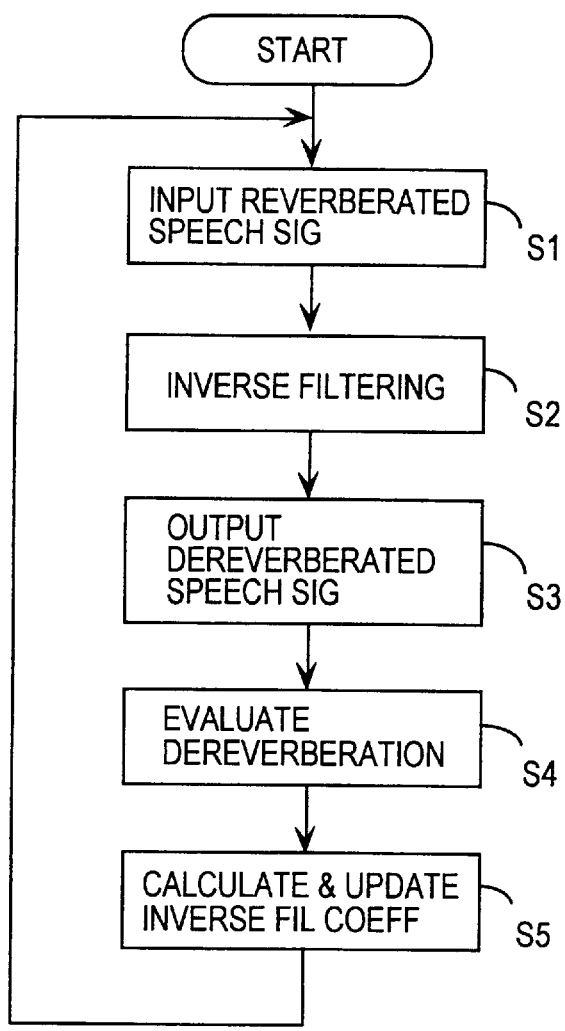
FIG. 9 is a flow chart showing the dereverberation method of the invention.

A method of dereverberation according to the invention will now be described. While the method basically comprises a sequence of operations which are the same as the dereverberation apparatus shown in FIG. 2, it will be described with reference to a flow chart shown in FIG. 9.

Step S1: at least two microphones disposed at different locations are used to receive a reverberant speech from a speaker to provide a pair of received signals;

step S2: an inverse filter processing is applied to the pair of the received signals using inverse filters corresponding to transfer functions from the speaker to respective microphone outputs, thereby providing a dereverberated signal;

step S3: the dereverberated signal is delivered as a speech signal;

step S4: an evaluation value is determined which corresponds to residual reverberation components on the basis of the pair of the received signals and the dereverberated signal; and step S5: inverse filter coefficients used in the inverse filter processing are determined so that the evaluation value is minimized, and then the inverse filter coefficients are updated before returning to step S1 and repeating the steps S1–S5 again.

While various functional components used in the embodiments shown in FIGS. 2 to 4, 7 and 8 mentioned above are illustrated in terms of hardware, they may be implemented by software utilizing a computer program. For example, in FIGS. 2, 3 and 4, received signals from microphones $7_1$, $7_2$ may be input to the input terminals $2_1$, $2_2$ of the dereverberation apparatus 100 according to the invention as digital signals, and all the processing operations performed by the dereverberation apparatus 100 may be executed by a computer. The received signals which are applied to the input terminals can be dereverberated according to a processing program which is based on the method of dereverberation according to the invention as mentioned above and stored in a memory within the computer, and then delivered.

When the method of dereverberation according to the invention is stored in a record medium of any desired configuration, the method of dereverberation stored in a record medium permits a dereverberation to be applied to any received input signal whenever such dereverberation is desired.

While the invention has been described above in connection with the elimination of reverberant components of speech which is uttered by a speaker in a room, the acoustic signal to be received may be any natural sound such as a crying of animals, mechanical friction sound or a sound of percussion or impacts, or may be a sound which is electrically reproduced. Effect of the Invention As described, with the dereverberation method and apparatus of the invention, an evaluation of the dereverberation performance is made using a dereverberated speech, and inverse filter coefficients are determined and updated so that result of evaluation is sequentially improved. In this manner, the determination of a transfer function in advance becomes unnecessary, and the dereverberation is applicable to any situation in which the determination of the transfer functions in advance is impossible or where the transfer functions vary from time to time, both of which represent difficulties experienced with the prior art. Accordingly, the method and apparatus for dereverberation of the invention can be effectively applied to provide clear speech by eliminating the reverberation from speech which is buried in the reverberations in a situation such as occurs in a conference or a lecture which takes place in a auditorium, a big conference room or a hall where it is difficult to determine the transfer functions in advance by generating a reference signal.

With the method and the apparatus of the invention, the estimation of transfer functions is made at the same time as the dereverberation, and accordingly, transfer functions can be determined without making an estimation of the transfer functions in advance. Accordingly, the apparatus for dereverberation of the invention can be effectively used when it is desired to determine transfer functions in a situation which makes estimation of the transfer functions by generating a reference signal in advance difficult during a conference or a lecture which takes place in an auditorium, a big conference room or a hall.

What is claimed is:

1. A method of dereverberation in which reverberant components are eliminated from a reverberant sound in a reverberant room, comprising the steps of:

(a) using at least two microphones disposed at different locations to receive a reverberant sound from a sound source to provide first and second received signals as inputs;

(b) applying first and second inverse filter processing to the first and the second received signals and adding the results of the processing together to provide a dereverberated signal, the processings using inverse filter coefficients corresponding to first and second transfer functions from the sound source to respective inputs of the first and the second received signals;

(c) delivering the dereverberated signal as a dereverberated sound signal while determining evaluation values which correspond to residual reverberant components on the basis of the first and the second received signals and the dereverberated signal;

(d) determining the inverse filter coefficients used in the inverse filter processing so that the evaluation values are brought most close to 0, and using the inverse filter coefficients thus determined to update the inverse filter coefficients; and (e) returning to the step (a) and repeating the steps (a)–(d) again.

2. A method according to claim 1 in which the step (c) includes applying first and second filter processings to the dereverberated signal in accordance with a first and a second simulating transfer functions which simulate the first and the second transfer functions and deriving, as the evaluation values, differences between the results of said first and second filter processings and the first and the second received signals, respectively; and the step (e) includes determining filter coefficients of the first and the second simulating transfer functions so that the evaluation values are brought most close to 0.

3. A method according to claim 2 in which the step (c) includes a step of applying duplicate filter processings to the second and the first received signals in accordance with the first and the second simulating transfer functions and delivering a difference between results of the duplicate filter processings as another evaluation value, and in which the step (d) includes determining filter coefficients of the first and the second inverse filters and the filter coefficients of the first and the second simulating transfer functions so that the first mentioned evaluation values and said another evaluation value, respectively, are brought most close to 0.

4. A method according to one of the claims 1, 2 and 3 in which the step (a) includes dividing the first and second received signals into a predetermined plurality of sub-bands and decimating a set of the divided first and the second received signals at a given decimation rate to provide a set of the first and the second sub-band received signals, and in which the steps (b)–(d) execute the processing operations on the first and the second sub-band received signals in each sub-band as the first and the second received signals which are supplied as inputs, thereby producing a sub-band dereverberated signal from the first and the second sub-band received signals of each sub-band, and wherein said method further includes a step of interpolating each of the sub-band dereverberated signals obtained in the respective sub-bands to an original sample rate and synthesizing all the interpolated sub-band dereverberated signals to be delivered as a whole band dereverberated signal.

5. A method according to claim 1 in which a third microphone is disposed at a location different from the locations of said two microphones;

said step (a) includes receiving by the third microphone a reverberant sound from the sound source to provide a third received signal as an input;

said step (b) includes applying an inverse filter processing to the third received signal by using inverse filter coefficients corresponding to a third transfer function from the sound source to the input of the third received signals, and adding together the processing results of the first, second and third received signal to obtain the dereverberated signal;

said step (c) includes determining an evaluation value which correspond to residual reverberant components on the basis of the third received signal and the dereverberated signal; and said step (d) includes calculating and updating the inverse filter coefficients used in the inverse filter processing so that all of the evaluation values are brought most close to 0.

6. A method according to claim 5 in which the step (b) is a step of applying first, second and third inverse filter processings to the first, the second and the third received signals, respectively, and adding results of the processings together to provide the dereverberated signal, in which the step (c) is a step of applying filter processings to the dereverberated signal in accordance with first, second and third simulating transfer functions which simulate the first, second and third transfer functions, respectively, and obtaining, as the evaluation values, differences between the processing results and the first, the second and the third received signal, respectively, and in which the step (d) is a step of determining filter coefficients corresponding to the first, the second and the third simulating transfer functions so that all of the evaluation values are brought most close to 0.

7. A record medium having the method according to one of claims 1, 2 and 3 recorded therein.

8. A record medium having the method according to claim 4 recorded therein.

9. An apparatus for dereverberation in which reverberation is eliminated from a reverberant sound which is emitted by a sound source and received in a reverberant room, comprising:

first channel reverberant sound input means for supplying a reverberant sound which is received at a first location as a first received signal;

second channel reverberant sound input means for supplying a reverberant sound which is received at a second location different from the first location as a second received signal;

inverse filter processing means including a first inverse filter which processes the reverberant sound from the first channel reverberant sound input means according to inverse filter coefficients having inverse characteristic of a transfer function of said first channel, a second inverse filter which processes the reverberant sound from the second channel reverberant sound input means according to inverse filter coefficients having inverse characteristic of a transfer function of the second channel, and an adder for adding an output signal from said first inverse filter and an output signal from said second inverse filter together and delivering a sum as the dereverberated signal;

dereverberation performance evaluation means for providing evaluation values which correspond to residual reverberant components on the basis of the first and the second received signals and the dereverberated signal from the inverse filter processing means; and inverse filter coefficients calculation means for determining inverse filter coefficients of the inverse filter processing means so that the evaluation values are brought most close to 0.

10. An apparatus according to claim 9 in which the inverse filter processing means comprises a first inverse filter which processes the first received signal input from the first channel reverberant sound input means according to an inverse filter of a transfer function of the first channel, a second inverse filter which processes a reverberant sound input from the second channel reverberant sound input means according to an inverse filter of a transfer function of the inverse filter coefficients calculation means for determining inverse filter coefficients of the inverse filter processing means so that the evaluation values are brought most close to 0.

11. An apparatus according to claim 10 which further includes separate evaluation means that is separate from the dereverberation performance evaluation means, and restraint means which applies a restraint to the determination of inverse filter coefficients by the inverse filter coefficients calculation means and to a result of estimation by the transfer function estimation means.

12. An apparatus according to claim 11 in which the filter coefficients restraint means comprises a first channel transfer function simulating duplicate filter which duplicates the first channel transfer function simulating filter, a second channel transfer function simulating duplicate filter which duplicates the second channel transfer function simulating filter, and an error detection means for detecting an error between a signal which results from the reverberant sound input from said second channel reverberant sound input means as passed through said first channel transfer function simulating duplicate filter and a signal which results from the reverberant sound input from said first channel reverberant sound input means as passed through said second channel transfer function simulating duplicate filter;

said inverse filter coefficients calculation means determining inverse filter coefficients of said inverse filter processing means so that output signals from said first and second subtractors and said error detection means are brought most close to 0;

said transfer function estimation means determining filter coefficients of said first channel transfer function simulating filter and filter coefficients of said second channel transfer function simulating filter so that output signals from said first and second subtractors and said error detection means are brought most close to 0.

13. An apparatus according to one of the claims 10, 11 and 12 in which said transfer function estimation means adaptively determines filter coefficients of said first channel transfer function simulating filter and the filter coefficients of said second channel transfer function simulating filter.

14. An apparatus according to one of the claims 9, 10, 11 and 12 in which said inverse filter coefficients calculation means comprises means for determining inverse filter coefficients adaptively on the basis of a result of evaluation by said dereverberation performance evaluation means.

15. An apparatus according to claim 13 in which said inverse filter coefficients calculation means comprises means for adaptively determining inverse filter coefficients on the basis of a result of evaluation by said dereverberation performance evaluation means.

16. An apparatus for dereverberation according to claim 9, further including third channel reverberant sound input means to which a reverberant sound received at a third location different from said first and the second locations is input as a third received signal;

said inverse filter processing means including means for applying an inverse filter processing to the third received signal from the third channel using an inverse filter corresponding to a transfer function from the sound source to the third channel input means and adding together the inverse filter processing results of the first, second and third received signals to obtain the dereverberated signal; and said dereverberation performance evaluation means including means for determining an evaluation value corresponding to a residual reverberant component on the basis of the third received signal and the dereverberated signal from the inverse filter processing means.

17. An apparatus for dereverberation according to claim 16 in which the inverse filter processing means additionally includes a third inverse filter which applies an inverse filter processing to the third received signal input from the third channel reverberant sound input means according to an inverse filter corresponding to a transfer function of the third channel, the adder adding together output signals from the first, second and third inverse filters to deliver the resulting sum as the dereverberated signal; and the dereverberation performance evaluation means comprises a third channel transfer function simulating filter which simulates a transfer function from a sound source to the third channel reverberant sound input means, and a third subtractor for forming a difference between a reverberant sound input from the third channel reverberant sound input means and a signal which results from an output signal from the adder as passed through the third channel transfer function simulating filter, and in which the transfer function estimation part determines filter coefficients used in the first, second and third channel transfer function simulating filters so that output signals from the first, second and third subtractors are made equal to 0.

* * * * *